United States Patent
Jensen

(10) Patent No.: US 10,538,153 B2
(45) Date of Patent: Jan. 21, 2020

(54) VEHICLE DRIVEN BY AN ELECTRIC MOTOR

(71) Applicant: Eberspächer Climate Control Systems GmbH & Co. KG, Esslingen (DE)

(72) Inventor: Hans Jensen, Dettingen unter Teck (DE)

(73) Assignee: Eberspächer Climate Control Systems Gmbh & Co. KG, Esslingen (DE)

( * ) Notice: Subject to any disclaimer, the term of this patent is extended or adjusted under 35 U.S.C. 154(b) by 0 days.

(21) Appl. No.: 16/163,979

(22) Filed: Oct. 18, 2018

(65) Prior Publication Data

US 2019/0118669 A1 Apr. 25, 2019

(30) Foreign Application Priority Data

Oct. 20, 2017 (DE) .......................... 10 2017 124 534
Dec. 7, 2017 (DE) .......................... 10 2017 129 121

(51) Int. Cl.
*B60K 1/04* (2019.01)
*B60L 50/16* (2019.01)
*B60L 53/80* (2019.01)
*B60L 58/12* (2019.01)

(52) U.S. Cl.
CPC ............... *B60K 1/04* (2013.01); *B60L 50/16* (2019.02); *B60L 53/80* (2019.02); *B60L 58/12* (2019.02); *B60K 2001/0444* (2013.01); *B60Y 2400/204* (2013.01)

(58) Field of Classification Search
CPC B60K 2400/204; B60K 11/1861; B60K 1/04; B60K 2001/0444; B60L 11/14
See application file for complete search history.

(56) References Cited

U.S. PATENT DOCUMENTS

| 5,559,420 | A | 9/1996 | Kohchi |
| 8,963,481 | B2* | 2/2015 | Prosser ................... B60L 53/57 |
| | | | 320/104 |
| 2010/0065344 | A1 | 3/2010 | Collings, III |
| 2010/0141201 | A1 | 6/2010 | Littrell et al. |
| 2013/0282472 | A1 | 10/2013 | Penilla et al. |
| 2015/0123611 | A1 | 5/2015 | Huang |
| 2017/0349039 | A1* | 12/2017 | Rayner ................... B60L 53/68 |

FOREIGN PATENT DOCUMENTS

| DE | 10 2009 042 001 A1 | 3/2011 |
| DE | 10 2013 015 637 A1 | 4/2015 |
| EP | 2 712 763 A1 | 4/2014 |
| EP | 2843798 A1 | 3/2015 |
| FR | 3 039 479 A1 | 2/2017 |
| RU | 135189 U1 | 11/2013 |
| WO | 2012154990 A2 | 11/2012 |

* cited by examiner

*Primary Examiner* — John D Walters
*Assistant Examiner* — James J Triggs
(74) *Attorney, Agent, or Firm* — McGlew and Tuttle, P.C.

(57) ABSTRACT

A vehicle driven by an electric motor includes a drive unit (16) with at least one electric motor (18), with at least one energy storage device (22) permanently installed in the vehicle and an actuating unit (24) for controlling the flow of energy between the at least one electric motor (18) and the at least one energy storage device (22) permanently installed in the vehicle. An interface (30) has with at least one terminal area (32, 34, 36) for a replaceable energy storage device (38, 40).

20 Claims, 1 Drawing Sheet

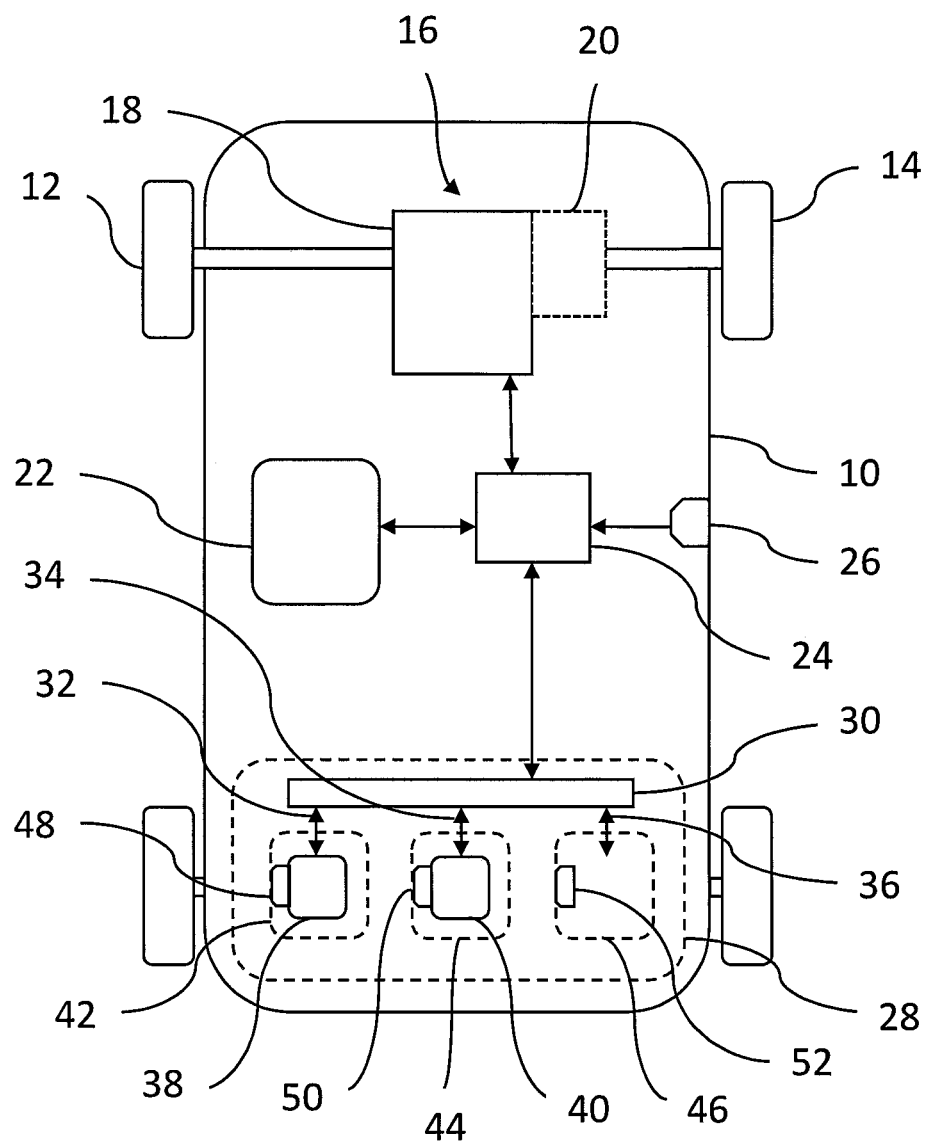

VEHICLE DRIVEN BY AN ELECTRIC MOTOR

CROSS REFERENCE TO RELATED APPLICATIONS

This application claims the benefit of priority under 35 U.S.C. § 119 of German Applications DE 10 2017 124 534.0, filed Oct. 20, 2017 and DE 10 2017 129 121.0, filed Dec. 7, 2017, the entire contents of which are incorporated herein by reference.

TECHNICAL FIELD

The present invention pertains to a vehicle driven by an electric motor. Such a vehicle operated by an electric motor may be, for example, a vehicle which is operated only by an electric motor, but may, as an alternative, also be a vehicle, the drive unit of which is configured in the manner of a so-called plug-in hybrid drive with at least one electric motor and an internal combustion engine.

BACKGROUND

In case of vehicles operated by an electric motor, there is, in principle, the problem that the range of such vehicles is restricted because of the limited storage capacity of the energy storage devices, i.e., of the vehicle batteries. Even though the number of available charging stations is increasing, the charging process takes up a period of time which is frequently considered by the users of such vehicles as unacceptable. Especially the need to have to repeatedly charge energy storage devices during longer trips and thereby to have to repeatedly spend time for charging, which is, in principle, already considered to be too long, and a network of charging stations that is insufficiently dense in various regions are considered to be essential aspects mentioned against the purchase of a vehicle operated by an electric motor.

SUMMARY OF THE INVENTION

An object of the present invention is to provide a vehicle driven by an electric motor, in which the storage capacity for electrical energy can be increased in a simple manner and can be adapted to a changing demand.

This object is accomplished according to the present invention by a vehicle driven by an electric motor, comprising a drive unit with at least one electric motor, with at least one energy storage device permanently installed in the vehicle and an actuating unit for controlling the flow of energy between the at least one electric motor and the at least one energy storage device permanently installed (more difficult to remove than a removable energy storage device and intended to be permanent) in the vehicle, and further comprising an interface with at least one terminal area for a replaceable energy storage device.

In case of a vehicle operated by an electric motor configured according to the present invention, it is possible to provide one additional energy storage device or a plurality of additional energy storage devices in the vehicle in addition to the energy storage device permanently installed in the vehicle and thus, in principle, not replaceable by the user of the vehicle. If longer trips or trips in regions with insufficient availability of charging stations are planned, in addition to the permanently installed energy storage device, which may have, for example, a storage capacity that is sufficient for a travel distance of 300-500 km, it thus becomes possible to provide further storage capacity in order to be able to increase the range of a vehicle thus equipped in this manner and to adapt to the necessary demand.

In order to be able to guarantee a reliable exchange of electrical energy between one replaceable energy storage device or a plurality of replaceable energy storage devices connected to the interface and the at least one electric motor, it is proposed that the actuating unit be configured to control and regulate the flow of energy between the at least one electric motor and at least one replaceable energy storage device connected to a terminal area.

The interface may comprise a plurality of terminal areas to be able to guarantee a high variability in the adaptation of the storage capacity in a vehicle.

For an efficient utilization of the storage space available in a vehicle, it is proposed that at least one terminal area be provided in a cargo space or/and on a rear carrier or/and in a roof box or/and on a trunk lid or/and on a trailer.

An energy storage device fixing device may be provided in association with each terminal area for a stable positioning of such an energy storage device to be additionally provided in a vehicle. For a variable accommodation on a vehicle, at least one energy storage device fixing device may thereby be provided in a cargo space or/and on a rear carrier or/and in a roof box or/and on a trunk lid or/and on a trailer.

In order to make it possible for the user of a vehicle, thus configured, to carry out a replacement of a replaceable energy storage device in a timely manner, it is proposed that the actuating unit be configured to provide information about the state of charge of each replaceable energy storage device connected to the interface.

To guarantee an efficient utilization of the energy stored in replaceable energy storage devices, it is proposed that the actuating unit be configured to influence, control and/or regulate the flow of energy between the replaceable energy storage devices and the at least one electric motor when a plurality of replaceable energy storage devices are connected to the interface such that the replaceable energy storage devices are run down sequentially.

The principles of the present invention can be applied in vehicles operated solely by an electric motor, but may advantageously also contribute to an increase in the range when the drive unit comprises an internal combustion engine.

The present invention will be described in detail below with reference to the attached FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic diagram showing a vehicle driven by an electric motor.

DESCRIPTION OF PREFERRED EMBODIMENTS

Referring to the drawings, a vehicle 10 driven by an electric motor shown in FIG. 1 comprises a drive unit 16 associated with wheels 12, 14 to be driven. The drive unit 16 comprises at least one electric motor 18 and may additionally have an internal combustion engine 20 in case of a so-called plug-in hybrid drive.

Electrical energy, from which the at least one electric motor 18 is fed with electrical energy in order to drive the vehicle 10, is stored in an energy storage device 22 permanently installed in the vehicle 10. Other consumers of electrical energy present in the electrical system of the vehicle 10 may also be fed from the energy storage device 22. An actuating unit 24 controls or regulates the exchange of electrical energy between the energy storage device 22 and the at least one electric motor 18. This pertains to a state of traction, in which the at least one electric motor 18 delivers a drive torque, in order to drive the vehicle and thus is fed with electrical energy from the energy storage device 22. The actuating unit 24 may also influence, i.e., control or regulate, the flow of energy between the at least one electric motor 18 and the fixed energy storage device 22 in a coasting state, in which the at least one electric motor 18 may be operated as a generator, to provide electrical energy for storage in the energy storage device 22. Further, for charging the energy storage device 22, the actuating unit 24 may control or regulate the flow of energy between a charging terminal 26, to which an external charging station may be connected, and the energy storage device 22, and may establish a connection between the charging terminal 26 and the energy storage device 22.

It should be pointed out that the energy storage device 22 may comprise a plurality of energy storage units, which may be structurally linked with one another, but, in principle, may also be accommodated at different positions of the vehicle 10 for the efficient utilization of the space available for installation.

The vehicle 10 further comprises an interface 30 with a plurality of terminal areas 32, 34, 36, for example, in a cargo space 28, e.g., trunk in a passenger car. A replaceable energy storage device 38, 40 may be connected to each terminal area 32, 34, 36. For this purpose, each energy storage device receiving area 42, 44, 46 is provided with an energy storage device fixing device 48, 50, 52 in the area of the interface 30 or of the terminal areas 32, 34, 36 associated with each terminal area 32, 34, 36. The energy storage device receiving areas 42, 44, 46 may be shaped in coordination with the replaceable energy storage devices 38, 40 to be arranged therein such that the energy storage device receiving area 42, 44, 46 predefine a defined positioning of the energy storage devices 38, 40, for example, by means of positive locking, in which position the energy storage devices 38, 40 are held by the respective, associated energy storage device fixing device 48, 50, 52, for example, by a clamping or tensioning device that is a part of each energy storage device receiving area 42, 44, 46. For example, the energy storage device fixing devices 48, 50, 52 may have quick-release mechanisms or bolts, which can be tightened for fixing a corresponding replaceable energy storage device 38, 40 to cooperating fixing structure of the energy storage device receiving area 42, 44, 46.

The actuating unit 24 comprises one or more processor, a memory, selectively controllable switches, and charging circuitry, that is configured to control or regulate the exchange of electrical energy between the replaceable energy storage devices 38, 40 connected to the interface 30 and the at least one electric motor 18. In this manner, the energy stored in the replaceable energy storage devices 38, 40 can be used to provide energy for the operation of the at least one electric motor 18 and possibly of other consumers of electrical energy in the vehicle 10 in addition to the energy stored in the energy storage device 22 permanently installed in the vehicle. The actuating unit 24 may also be configured in coasting mode to send electrical energy provided by the electric motor 18 operating as a generator to the replaceable energy storage device or replaceable energy storage devices 38, 40 connected to the interface 30 in order to charge the replaceable energy storage devices 38, 40 again. Different charging strategies are possible according to the invention. For example, the actuating unit 24 may thus be configured to give preference to the charging of the energy storage device 22 permanently installed in the vehicle so that during the charging operation it is first ensured that the energy storage device 22 permanently installed in the vehicle is charged or will be charged before a change is made over to charging one or more replaceable energy storage devices 38, 40. Different strategies may also be selected for the utilization of the energy stored in the different energy storage devices 22, 38, 40. For example, preference may thus be given to the running down of the replaceable energy storage devices 38, 40, so that first the replaceable energy storage devices 38, 40 are run down during traction mode, and only if these can no longer be used to supply the at least one electric motor 18 or other consumers in the vehicle 10, the energy that is stored in the energy storage device 22 permanently installed in the vehicle is also accessed. If a plurality of replaceable energy storage devices 38, 40 are connected to the interface 30, it is advantageous to run these down sequentially, so that a replaceable energy storage device already run down and no longer usable for the supply of the at least one electric motor 18 can be replaced by a charged replaceable energy storage device, while a replaceable energy storage device that is still charged or is not entirely run down can still remain in the vehicle for the time being. To make this possible, the actuating unit 24 may be configured to detect the state of charge of the replaceable energy storage devices 38, 40 connected to the interface 30 and to couple the individual replaceable energy storage devices 38, 40 chronologically sequentially with the at least one electric motor 18 corresponding to the detected state of charge in order to correspondingly run down the replaceable energy storage devices 38, 40 one after the other.

In the vehicle 10 configured according to the present invention, it becomes possible to adapt the range of same to the present demand. If the vehicle 10 is used, for example, in a normal, usual operation, in which it can be assumed that the daily travel distance does not exceed a range covered by the energy stored in the energy storage device 22 permanently installed in the vehicle, the provision of additional replaceable energy storage devices can be dispensed with. If the demand exceeds the energy stored in the energy storage device 22 permanently installed in the vehicle, one or more replaceable energy storage devices 38, 40 may be connected to the interface 30, in turn depending on the demand actually present. Since the storage capacity of these replaceable energy storage devices 38, 40 is generally known, it is easily recognizable for a user of a vehicle thus configured how many replaceable energy storage devices are to be connected to the interface 30 in order to be able to cover the present demand.

For operation of a vehicle 10 configured according to the present invention, for example, a supply system may be configured, in which charged replaceable energy storage devices are kept ready, for example, at gas stations or service areas or facilities specially provided for this. Similar to gassing up fuel-operated vehicles, the user of such a vehicle can replace a run-down replaceable energy storage device with a charged replaceable energy storage device at such a station or facility in case of corresponding demand and thus continue the trip immediately and without the need to have to wait for a charging time. For this, the actuating unit 24 may be configured to provide, for example, to display, information to the user of such a configured vehicle, which information shows the state of charge not only of the energy storage device 22 permanently installed in the vehicle, but also the state of charge of each replaceable energy storage device connected to the interface 30. The user then recognizes which of the replaceable energy storage devices 38, 40 is already run down and, if needed, has to be replaced with a charged replaceable energy storage device. Even in case of a demand first recognized in the course of a trip, the user of such a configured vehicle can head for such a station or facility in order to pick up one or more replaceable energy storage devices there. In principle, the users of such vehicles may also stock up replaceable energy storage devices in order to accommodate one or more replaceable energy storage devices in the vehicle, if needed, before starting a trip.

It should further be noted that such replaceable energy storage devices may also be accommodated in different areas of a vehicle. It is especially possible to accommodate replaceable energy storage devices also in an area outside of the vehicle, for example, in a rear carrier or in a roof box. Accommodation in the trunk or on the trunk lid or in a trailer is also possible. In principle, it is also possible to distribute replaceable energy storage devices to different accommodation locations of a vehicle, i.e., to accommodate, for example, some replaceable energy devices in a trunk or a cargo space of the vehicle and to accommodate other replaceable energy storage devices in a different area of the vehicle, for example, in a roof box or especially in a trailer in case of trucks. It is also apparent that the precautions explained above for providing an electrical terminal, on the one hand, and for a stable mechanical connection, on the other hand, are to be provided at such areas provided on a vehicle or on a trailer to be coupled with it, in which areas replaceable energy storage devices shall be accommodated. As an alternative, it is possible that the electrical connection to a terminal area provided in the interior of the vehicle takes place by means of a connection cable especially in case of accommodation outside of a vehicle interior or cargo space.

While specific embodiments of the invention have been shown and described in detail to illustrate the application of the principles of the invention, it will be understood that the invention may be embodied otherwise without departing from such principles.

What is claimed is:

1. A vehicle driven by an electric motor, the vehicle comprising:
   a drive unit comprising at least one electric motor;
   at least one energy storage device permanently installed in the vehicle;
   an actuating unit for controlling a flow of energy between the at least one electric motor and the at least one energy storage device permanently installed in the vehicle;
   an interface comprising a plurality of terminal areas, each terminal area being provided for a replaceable energy storage devices;
   a plurality of replaceable energy storage devices, each replaceable energy storage device being connected to one of the terminal areas, wherein the actuating unit is configured to influence a flow of energy between the at least one electric motor and the replaceable energy storage devices connected to the terminal areas, wherein the actuating unit is configured to influence a flow of energy from the replaceable energy storage devices to the at least one electric motor such that the replaceable energy storage devices are run down sequentially, wherein the actuating unit is further configured to influence a flow of energy from the energy storage device permanently installed in the vehicle and the replaceable energy storage devices to the at least one electric motor in a traction mode such that first the replaceable energy storage devices are run down and, only if the replaceable energy storage devices can no longer supply the at least one electric motor, the energy storage device permanently installed in the vehicle is accessed for supplying energy to the at least one electric motor.

2. A vehicle in accordance with claim 1, further comprising a cargo space, wherein the at least one terminal area is provided in the cargo space.

3. A vehicle in accordance with claim 1, further comprising a replaceable energy storage device fixing device, the replaceable energy storage device fixing device is associated with the at least one terminal area.

4. A vehicle in accordance with claim 3, further comprising a cargo space wherein at least one replaceable energy storage device fixing device is provided in the cargo space.

5. A vehicle in accordance with claim 1, wherein the actuating unit is configured to provide information about a state of charge of each replaceable energy storage device connected to the interface.

6. A vehicle in accordance with claim 1, wherein the drive unit further comprises an internal combustion engine.

7. A vehicle in accordance with claim 1, further comprising a rear carrier, wherein the at least one terminal area is provided on the rear carrier.

8. A vehicle in accordance with claim 1, further comprising a roof box, wherein the at least one terminal area is provided in the roof box.

9. A vehicle in accordance with claim 1, further comprising a trunk lid, wherein the at least one terminal area is provided on the trunk lid.

10. A vehicle in accordance with claim 1, further comprising a trailer, wherein the at least one terminal area is provided on the trailer.

11. A vehicle in accordance with claim 3, further comprising a rear carrier, wherein at least one replaceable energy storage device fixing device is provided on the rear carrier.

12. A vehicle in accordance with claim 3, further comprising a roof box, wherein at least one replaceable energy storage device fixing device is provided in the roof box.

13. A vehicle in accordance with claim 3, further comprising a trunk lid, wherein at least one replaceable energy storage device fixing device is provided on the trunk lid.

14. A vehicle in accordance with claim 3, further comprising a trailer, wherein at least one replaceable energy storage device fixing device is provided on the trailer.

15. A vehicle driven by an electric motor, the vehicle comprising:
   a drive unit comprising at least one electric motor;
   an energy storage device permanently installed in the vehicle;
   an actuating unit for controlling a flow of energy between the at least one electric motor and at least the energy storage device permanently installed in the vehicle;
   a plurality of replaceable energy storage devices;
   an interface comprising a plurality of terminal areas, each of the terminal areas being associated with one of the replaceable energy storage devices, each of the replaceable energy storage devices being connected to one of the terminal areas, wherein the actuating unit is configured to:
- control a flow of energy between the at least one electric motor and the replaceable energy storage devices;
- control a flow of energy from the replaceable energy storage devices to the at least one electric motor such that energy from each of the replaceable energy storage devices is delivered to the at least one electric motor one after one another prior to energy from the energy storage device permanently installed in the vehicle being supplied to the at least one electric motor;
- provide the energy from the energy storage device permanently installed in the vehicle to the at least one electric motor only if the replaceable energy storage devices can no longer supply the at least one electric motor.

16. A vehicle in accordance with claim 15, further comprising a cargo space, wherein the at least one terminal area is provided at least in the cargo space, on a rear carrier, in a roof box, on a trunk lid and on a trailer.

17. A vehicle in accordance with claim 15, further comprising a replaceable energy storage device fixing device, the replaceable energy storage device fixing device being associated with one of the terminal areas.

18. A vehicle in accordance with claim 17, further comprising a cargo space wherein at least one replaceable energy storage device fixing device is provided at least one in the cargo space, on a rear carrier, in a roof box, on a trunk lid and on a trailer.

19. A vehicle driven by an electric motor, the vehicle comprising:
- a drive unit comprising at least one electric motor;
- at least one energy storage device permanently installed in the vehicle;
- an actuating unit;
- a plurality of replaceable energy storage devices;
- an interface comprising a plurality of terminal areas, each of the terminal areas being associated with one of the replaceable energy storage device, each of the replaceable energy storage devices being connected to one of the terminal areas, wherein the actuating unit is configured to control a flow of energy between the at least one electric motor and the at least one energy storage device permanently installed in the vehicle such that the energy from the energy storage device permanently installed in the vehicle is provided to the at least one electric motor only if the replaceable energy storage devices are depleted.

20. A vehicle in accordance with claim 19, wherein the actuating unit is further configured to provide the energy from each of the replaceable energy storage devices sequentially one after another prior to energy from the energy storage device permanently installed in the vehicle being supplied to the at least one electric motor.

* * * * *